United States Patent [19]

Nylund

[11] Patent Number: 4,994,234
[45] Date of Patent: Feb. 19, 1991

[54] CONTROLLING COOLANT FLOW TO NUCLEAR FUEL ASSEMBLIES

[75] Inventor: Olov Nylund, Västerås, Sweden

[73] Assignee: ABB Atom AB, Västerås, Sweden

[21] Appl. No.: 327,247

[22] Filed: Mar. 22, 1989

[30] Foreign Application Priority Data

Mar. 28, 1988 [SE] Sweden ............................ 8801141

[51] Int. Cl.⁵ ............................................. G21C 3/32
[52] U.S. Cl. .................................. 376/445; 376/451
[58] Field of Search ............... 376/445, 451; 137/457

[56] References Cited

U.S. PATENT DOCUMENTS 3,143,126 8/1964 Terry .................................. 137/457
4,684,501 8/1987 Lui ...................................... 376/446

FOREIGN PATENT DOCUMENTS 959470 6/1964 United Kingdom ................ 376/445

Primary Examiner—Donald P. Walsh
Assistant Examiner—Meena Chelliah
Attorney, Agent, or Firm—Watson, Cole, Grindle & Watson

[57] ABSTRACT

In a BWR- or PWR-type nuclear reactor, the fuel rods in the fuel assembly are cooled by a coolant flow which is pumped through the fuel core. Depending on the degree of burnup of the fuel rods, the coolant flow to the fuel assemblies may need to be changed for the cooling to be matched to local need. To control coolant flow on the basis of the degree of burnup of the fuel rods, the irradiation growth of elongated elements in the fuel assembly has been utilized.

8 Claims, 3 Drawing Sheets

CONTROLLING COOLANT FLOW TO NUCLEAR FUEL ASSEMBLIES

TECHNICAL FIELD

The present invention relates to a nuclear fuel assembly including means for controlling coolant flow to the fuel rods in the fuel assembly for a boiling water reactor (BWR) or a pressurized water reactor (PWR). By controlling the coolant flow to the fuel rods in the fuel assembly, the coolant flow can be adapted to the degree of utilization or "burnup" of the fuel rods.

DISCLOSURE OF THE INVENTION

During nuclear irradiation, the fuel rods in a fuel assembly can exhibit an irradiation growth which, because of the elongated shape of the fuel rods, results in a considerable linear expansion. The linear growth of the fuel rods relative to a framework supporting them in the fuel assembly, caused by the nuclear irradiation, can be utilized to achieve a burnup-dependent throttle control of the coolant flow. By throttling or cutting back the coolant flow to the most burnt-up fuel assemblies of a nuclear reactor, a larger coolant flow is available for supply to the less burnt-up fuel assemblies, which are thus loaded to a greater extent, without altering the total volume of coolant flowing through the reactor core. To enable the elongated fuel rods to be used for coolant flow control, one end of the fuel rods can be shaped so as to cooperate with an opposite opening for coolant in a top-tie plate or bottom-tie plate of the framework of the fuel assembly, thus controlling the coolant flow to the fuel rods of the fuel assembly. The fuel rods always grow to a greater extent than a fuel box in a fuel assembly for a BWR and to a greater extent than the control rod guide tubes of a fuel assembly for a PWR.

Alternatively, where the fuel assembly includes control rod guide tubes, these can be made of materials having two different irradiation growth rates. Thus, control rod guide tubes with a low irradiation growth rate may be attached to both the top-tie plate and the bottom-tie plate, whereas control rod guide tubes having a higher irradiation growth rate may be attached to the bottom-tie plate only but may support throttle members for coolant outlet openings in the top-tie plate. Because of the difference in irradiation growth rates, the throttle members will approach the outlet openings during burnup of fuel in the fuel assembly, thus progressively throttling the coolant flow through the fuel assembly.

With burnup-dependent throttle means, the reactor core can be charged for a better fuel utilization since a higher load can be permitted for relatively fresh fuel. Alternatively, or in addition, the energy used to pump coolant through the core can be reduced, because the coolant flow is distributed in an optimum manner so that a lower total coolant flow can be used.

BRIEF DESCRIPTION OF THE DRAWINGS

The invention will now be further described, by way of example, with reference to the accompanying drawings, in which.

DESCRIPTION OF THE PREFERRED EMBODIMENTS

Figure 1:
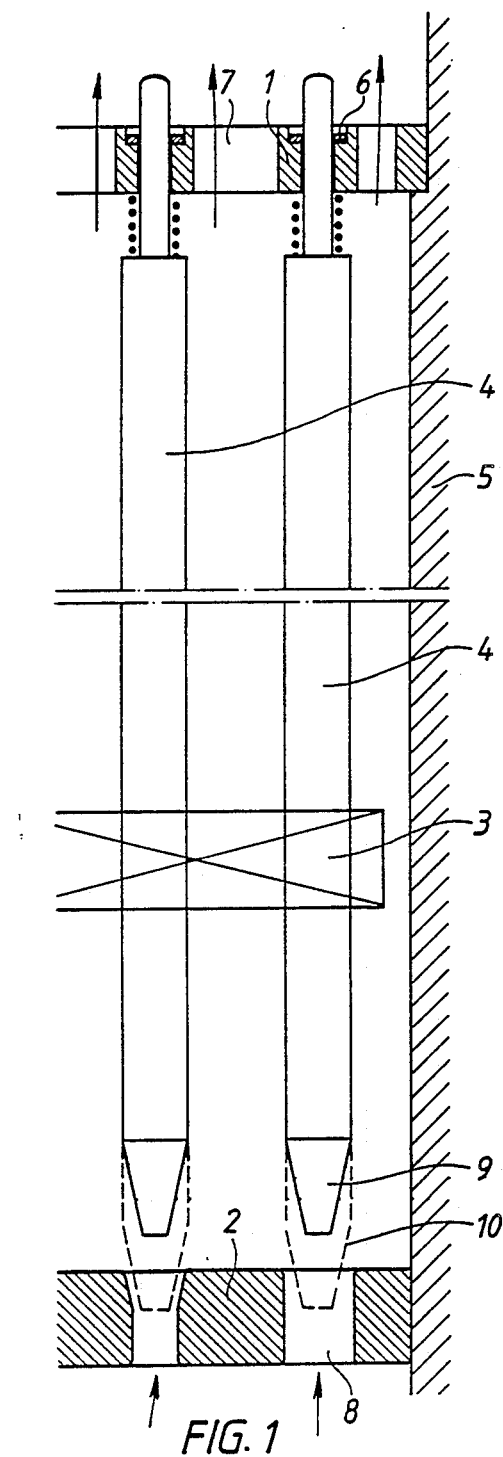
FIG. 1 shows two fuel rods in a nuclear fuel assembly having burnup-dependent inlet throttling.

FIG. 1 shows, in simplified form, part of the structure of a BWR or PWR fuel assembly which comprises a supporting framework having a top-tie plate 1, a bottom-tie plate 2 and a spacer 3 and, contained within the framework, an array of side-by-side located fuel rods 4 (only two of which are shown). In a complete fuel assembly, a bundle of fuel rods may be kept together and fixed by means of several spacers constituting a more complex framework than that shown. 5 designates a containing wall of a BWR fuel assembly or a wall of a control rod guide tube for a PWR fuel assembly which wall holds the support plates 1 and 2 in spaced-apart disposition and provides a further component of the framework.

Each fuel rod 4 shown in FIG. 1 is suspended from the top-tie plate 1, by means of a bayonet-type fixing 6. Between the regions of the top-tie plate 1 which accommodate the fixings 6 there are provided openings 7 permitting coolant to flow through the assembly upwardly past each fuel rod as shown by the arrows. The bottom-tie plate 2 is also provided with openings 8 for coolant flow. As illustrated, each opening 8 is arranged opposite to, but spaced from, the lower end 9 of a respective rod 4 in order to force the coolant to flow through an opening whose cross-sectional area is set by the length of the respective fuel rod 4. The linear growth of the fuel rods caused by nuclear irradiation, will occasion a burnup-dependent throttling of the coolant flow as the end 9 of any given rod 4 approaches the respective opening 8 in the bottom-tie plate 2. The ends 9 of the rods 4 and the corresponding openings 8 in the bottom-tie plate 2 are desirably shaped to optimize the desired throttling characteristics for coolant flow. The dashed contour line 10 indicates how the ends 9 can be extended because of the irradiation and how the frusto-conical end 9 of each rod 4 becomes located partially in the corresponding opening 8 in the bottom-tie plate 2. A burnup-dependent inlet throttling of each opening 8 is thus brought about simply by relative movement of the ends 9 of the rods 4 relative to the coolant openings 8 in the bottom-tie plate 2. The left-hand opening 8 shown in FIG. 1 is differently shaped to the right-hand opening 8 and this indicates how control can be exercised over the characteristics of the throttling system provided.

Figure 2:
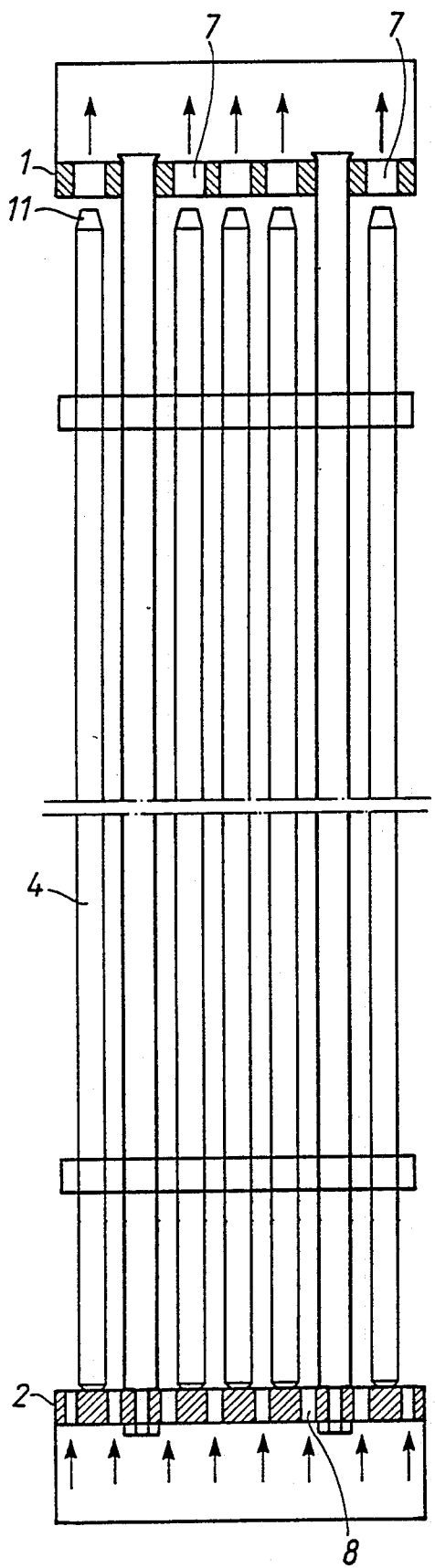
FIGS. 2 and 3 show fuel rods in a nuclear fuel assembly having burnup-dependent outlet throttling, in two stages of fuel utilization.
Figure 3:
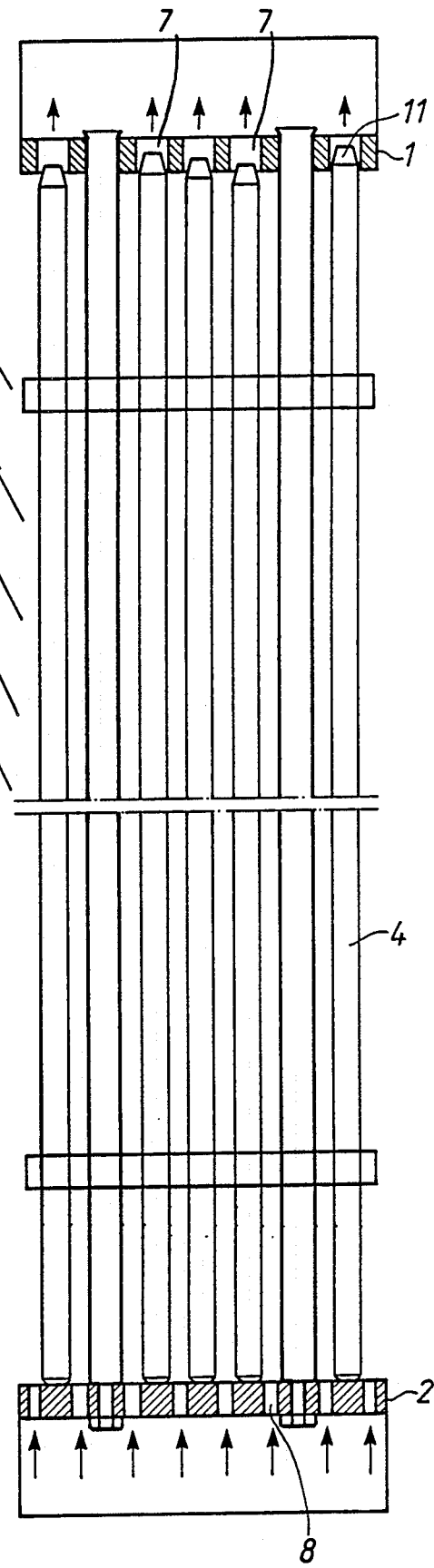

FIGS. 2 and 3 show, respectively, a fresh and a burnt-up PWR fuel assembly, with a burnup-dependent throttling means, which on this occasion acts on the outlet (or upper) coolant openings 7. For a PWR fuel assembly it may be more advantageous to throttle the outlet openings 7. The water which flows into the throttled fuel assembly will then be redistributed, in the upper part of the fuel assembly, to adjacently positioned fuel rods which are in greater need of it. The fuel assembly can thus be subjected to a higher load. The fuel rods 4 in FIGS. 2 and 3 rest on the bottom-tie plate 2, or are fixed thereto, and have free upper ends 11 directed towards the top-tie plate 1. By shaping the ends 11 of the rods 4 and the openings 7 of the plate 1 in suitable manners, the characteristic of the throttling relative to increase in length of the rods 4 can be adjusted. With a varying degree of burnup of the fuel rods or depending on varying materials in the fuel rods, a non-uniform outlet throttling can be obtained during the burnup.

FIG. 2 shows a fresh fuel assembly without any outlet throttling occurring, since the upper ends 11 of the rods 4 do not interfere with the coolant flow through the outlet openings 7. FIG. 3 shows a burnt-up fuel assembly in which the frusto-conical portions 11 of the upper ends of the rods 4 are more or less inserted into the openings 7 bringing about a genuine throttling of the coolant flow through the fuel assembly.

During burnup of a given fuel assembly, the fact that each fuel rod 4 expands as a function of the extent to which its fuel reserves are depleted, means that there is a more uniform exploitation of fuel resources in the assembly. Further the coolant flow to a burnt-up fuel assembly will partially be diverted towards another adjacent fuel assembly, for example one exhibiting a lower degree of burnup. Thus the burnup-related throttling means of this invention occasion better use of individual rods in an assembly and better use of adjacent assemblies in a nuclear core.

Figure 4:
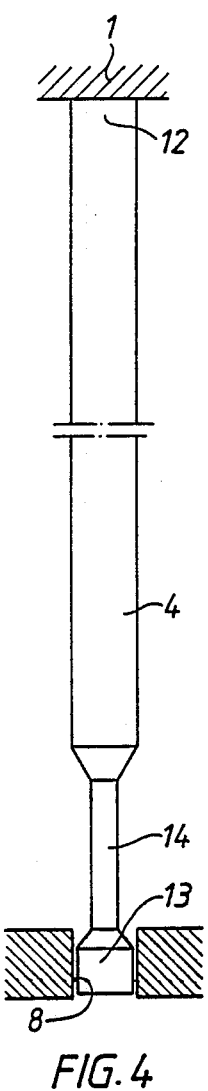
FIGS. 4 and 5 show a fuel rod with a burnup-dependent inlet opening in two stages of fuel utilization.
Figure 5:
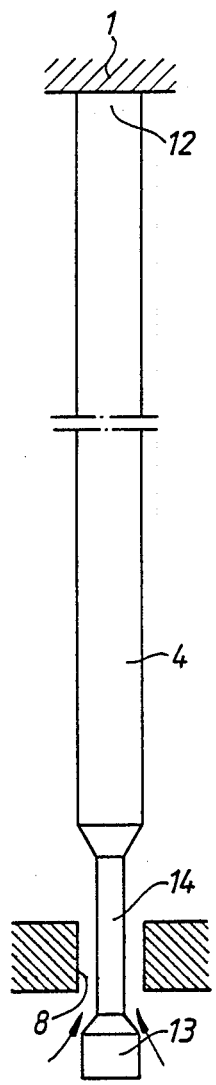

FIGS. 4 and 5 show an arrangement in which inlet throttling is reduced with increasing burnup. FIG. 4 shows a fuel rod 4 in a fresh fuel assembly with an upper end 12 fixed to a top-tie plate 1. The lower end of the fuel rod 4 may be formed with a tail 13 terminating a neck 14, the cross-section of the tail 13 substantially corresponding to an opening 8 in the bottom-tie plate 2. In place of the neck 14 the fuel rod 4 may be formed with a lower end having longitudinal slots therein. Because of the linear expansion, arising due to the nuclear irradiation growth, the rod 4 will grow downwards during burnup, to give the condition shown in FIG. 5, when the neck 14 of the fuel rod 4 will be located in the opening 8, thus obtaining a reduced inlet throttling resulting in an increased flow area for the upward coolant flow.

By arranging the fuel rods in a PWR fuel assembly in such a way that some rods grow upwards and some grow downwards, the inlet throttling can be reduced to the same extent as the outlet throttling increases. In this way, a redistribution of the passage of the coolant flow can be obtained without the total flow resistance increasing.

It is also possible to arrange, at the inlet, a redistribution of the flow through the fuel assembly by giving centrally located rods an increasing throttling and peripherally located rods a decreasing throttling with increased burnup.

Figure 6:
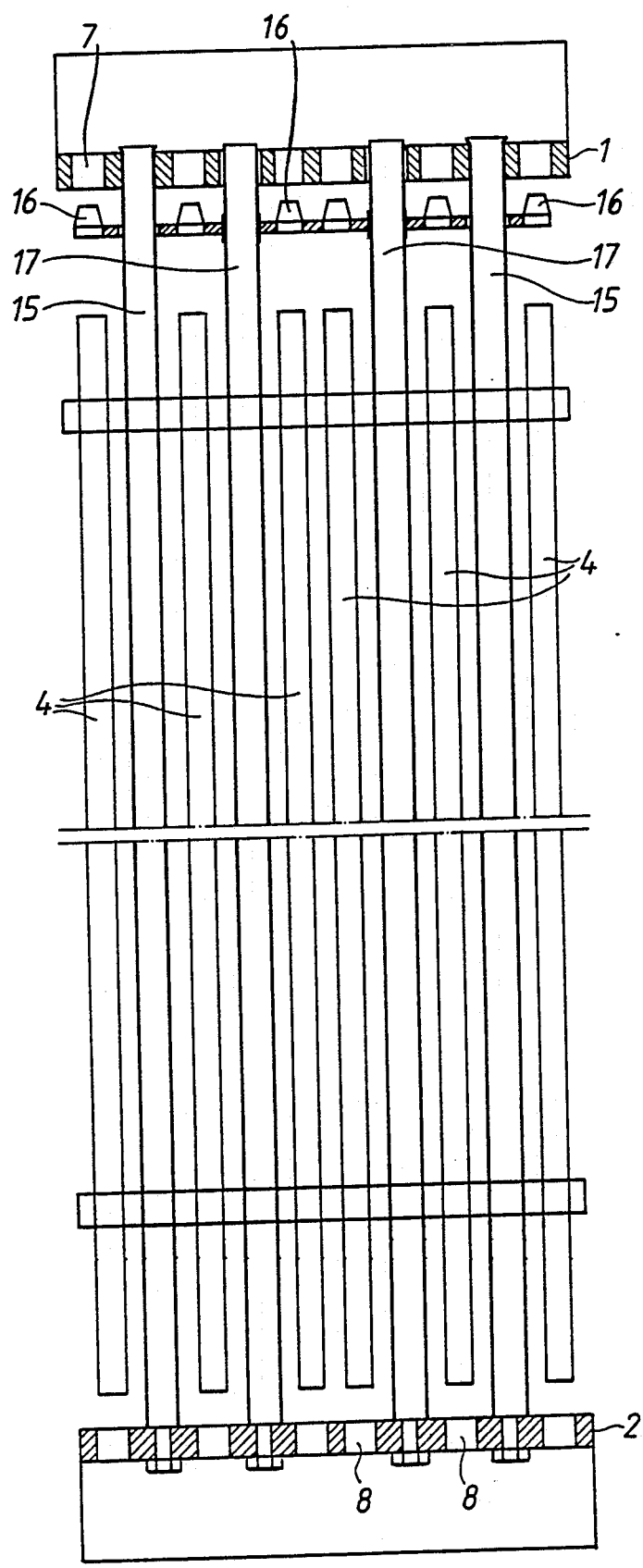
FIG. 6 shows a nuclear fuel assembly with control rod guide tubes having two different irradiation growth rates.

It is also feasible to control the flow through the fuel assembly by making a guide tube for a control rod of a material having a different irradiation growth rate than that of the fuel rods. FIG. 6 shows how a PWR fuel assembly with a burnup-dependent outlet throttling is formed. A top-tie plate 1 is fixed to control rod guide tubes 15 with a lower irradiation growth rate (for example tubes of stress-relieved annealed material). A member 16 is fixed to control rod guide tubes 17 with a higher irradiation growth (for example tubes of cold-worked material).

Different irradiation growth rates can be obtained by different manufacturing processes. Cold-worked tubes grow faster than stress-relieved annealed tubes. FIG. 6 shows means providing an outlet throttling, but an inlet throttling can be controlled in a corresponding manner. During burnup, the throttle member 16 will thus approach the top-tie plate 1. The throttle member 16 is adapted so as to more or less—or to different degrees-close off the openings 7 for the passage of coolant flow through the top-tie plate 1. The throttle member 16 may consist of a projection attached to a control rod guide tube 17, which projection may be located opposite to the opening 7 in the top-tie plate 1 and further be provided with a sealing or throttling portion adapted to the shape and size of the opening 7. With this type of outlet throttling, it is possible, in reactors of PWR type, to redistribute the flow from burnt-up fuel assemblies to fresh assemblies.

It will be appreciated that the arrangements illustrated are but examples of burnup-related coolant throttling means which can be used in the exercise of this invention and various modifications of the illustrated means are possible within the spirit and scope of the following claims.

What is claimed is:

1. In a fuel assembly of a nuclear reactor which includes a plurality of fuel rods and means to flow coolant past the fuel rods, there is provided a device for control of the coolant flow to the fuel rods, which fuel assembly comprises a top-tie plate, a bottom-tie plate and members connecting these plates to form a framework for the fuel rods and elongated elements directly or indirectly carried by the top-tie plate and/or the bottom-tie plate and selected from the group consisting of fuel rods and control rod guide tubes, said top-tie plate and said bottom-tie plate each being provided with a plurality of openings for coolant flow to the fuel rods, which device is characterized in that the said elongated elements exhibit an irradiation growth in their longitudinal direction that deviates from that of the said framework members, said elongated elements being provided with throttling bodies which cooperate with the openings in at least one of the top-tie plate and the bottom-tie plate, whereby, during nuclear irradiation, the elongated elements will be expanded to a greater extent than said framework members and the position of at least some of the throttling bodies will be changed in relation to the openings hence influencing the coolant flow past the fuel rods.

2. A device according to claim 1, characterized in that the elongated elements are made of a material having a higher irradiation growth than the framework members.

3. A device according to claim 1, characterized in that the elongated elements consist of fuel rods, the ends of at least some of which are provided with a respective throttling body so as to fit into corresponding openings in one of the top-tie plate and the bottom-tie plate.

4. A device according to claim 2, characterized in that the elongated elements consist of fuel rods, the ends of at least some of which are provided with a respective throttling body so as to fit into corresponding openings in one of the top-tie plate and the bottom-tie plate.

5. A device according to claim 1, characterized in that the elongated elements consist of control rod guide tubes carrying a throttle member acting as a throttling body and adapted to be moved towards the openings in one of the tie plates for throttling the coolant flow.

6. A device according to claim 2, characterized in that the elongated elements consist of control rod guide tubes carrying a throttle member acting as a throttling body and adapted to be moved towards the openings in one of the tie plates for throttling the coolant flow.

7. In a nuclear reactor fuel assembly comprising a plurality of fuel rods disposed side-by-side in a supporting framework providing upper and lower support plates each provided with coolant openings whereby coolant can flow past the fuel rods via said openings and in which assembly the length of the fuel rod extending between said plates changes with increasing utilization of fuel therein due to the effect of nuclear irradiation, the improvement of providing, adjacent to at least one end of at least some of the fuel rods, a coolant throttling body which can coact with the adjacent support plate to define a burnup-dependent coolant throttling means as the throttling bodies move relative to the openings during use of the fuel assembly.

8. A fuel assembly as claimed in claim 7, in which the fuel rods increase in length relative to the framework with increasing burnup of the fuel in the fuel rods.

* * * * *